UNITED STATES PATENT OFFICE.

MICHAEL B. RANDLE AND BENJAMIN E. TURNER, OF STATESBOROUGH, GA.

METHOD OF MANUFACTURING ARTIFICIAL STONE.

SPECIFICATION forming part of Letters Patent No. 298,026, dated May 6, 1884.

Application filed December 31, 1883. (No specimens.)

*To all whom it may concern:*

Be it known that we, MICHAEL B. RANDLE and BENJAMIN E. TURNER, citizens of the United States, residing at Statesborough, in the county of Bullock and State of Georgia, have invented certain new and useful Improvements in Methods of Manufacturing Artificial Stone; and we do hereby declare the following to be a full, clear, and exact description of the invention, such as will enable others skilled in the art to which it appertains to make and use the same.

Our invention relates to an improved method of manufacturing artificial stone in imitation of marble, which is specially designed as a material for tombstones or monuments.

The invention consists in the method of compounding the materials for the stone or plastic mass, and in the subsequent treatment, after hardening of the mass, to give it a polish and the white appearance of marble, all as will be hereinafter more fully described, and then set forth in the claim.

In carrying out our method we take one part of Portland cement, one part of pebble-grain sand, and about five pounds of quick-lime to two bushels of the mixed cement and sand. These substances are thoroughly commingled and made into a mortar or plastic mass by adding a sufficient amount of water and "working" the mass. Wooden molds, open at the top and lined at the bottom with cloth, are then resorted to for receiving the plastic mass prepared in the above-described manner. After the water or moisture has somewhat evaporated, the plastic mass contained in the molds is pressed down, this operation being generally performed by drawing a straight steel blade from one end of the open top of the mold to the other. After this step, the mass is soon in condition to receive the impression of a wooden or other type-block, which is used to impress letters, designs, or other characters on the partly-hardened mass. It will be obvious that these impressions may be omitted when the finished product is to be used for architectural and other purposes. In tombstones, however, words and characters are generally impressed into the mass. After a sufficient length of time, the hardened mass is taken out of the molds, and it then undergoes a polishing operation, which is performed by rubbing it with a cloth saturated with or holding a composition of cement, lime, and water. This composition is of such a consistency that it will enter and serve to fill up the holes or small cavities left in the surface of the stone after the operation of molding the same. The act of rubbing the stone with the polishing and filling material will leave the surface of the stone in a smooth condition, devoid of holes or pores, and thereupon lime-water is poured upon the stone until it is surcharged therewith, or until no more of the lime-water will penetrate the stone. This saturation of the stone with lime-water gives it a permanent white exterior, as is readily apparent. For this reason the stone resembles marble, and can be used as a substitute for the latter.

It has heretofore been the practice to apply a dressing of lime to artificial stone; but the same being only on the surface, it is liable to flake off by exposure to the weather or other causes, consequently exposing the dark ground of the stone. In our method, however, the stone, which has been darkened somewhat by the polishing operation, is subsequently given a pure white appearance by the permeation of its pores by the lime-water.

Another point of advantage derived by our method is that the admixture of sand and cement produces a hard stone, which can be boxed and shipped like genuine marble and other natural stones, there being no greater liability of breaking the same in transportation than with natural marble and stones of a corresponding size and form.

We are aware that it is not new to harden artificial stone by soaking it in a bath of water and an alkaline substance—such as lime, alum, and the like—and that natural and artificial stones have heretofore been saturated with a liquid silicate and a solution of lime-water.

Having thus described our invention, what we claim as new, and desire to secure by Letters Patent, is—

The herein-described method of manufacturing artificial stone, consisting in subjecting a molded and partially-hardened mass of cement, sand, and lime to a rubbing operation of cement, lime, and water for filling the cavities or pores in the stone and giving it a smooth or polished surface, and finally saturating the stone with lime-water, substantially as herein set forth.

In testimony whereof we affix our signatures in presence of two witnesses.

MICHAEL B. RANDLE.
BENJAMIN E. TURNER.

Witnesses:
W. B. GRINER,
E. P. SINGELLTON.